United States Patent
Noguchi

(10) Patent No.: US 10,054,025 B2
(45) Date of Patent: Aug. 21, 2018

(54) EXTERNAL AIR INTRODUCTION APPARATUS

(71) Applicant: FUJI JUKOGYO KABUSHIKI KAISHA, Tokyo (JP)

(72) Inventor: Masanori Noguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/077,041

(22) Filed: Mar. 22, 2016

(65) Prior Publication Data
US 2016/0281572 A1    Sep. 29, 2016

(30) Foreign Application Priority Data

Mar. 27, 2015    (JP) .................................. 2015-067707

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 3/30* | (2006.01) |
| *F01N 13/00* | (2010.01) |

(52) U.S. Cl.
CPC ............ *F01N 3/30* (2013.01); *F01N 13/002* (2013.01); *F01N 2270/02* (2013.01); *Y02T 10/20* (2013.01)

(58) Field of Classification Search
CPC . F01N 3/2066; F01N 3/30; F01N 3/34; F16K 15/16
USPC .......................................... 60/287, 288, 324
See application file for complete search history.

(56) References Cited

U.S. PATENT DOCUMENTS

| | | | | |
|---|---|---|---|---|
| 3,491,533 A | * | 1/1970 | Schrag | ...................... F01N 3/30 55/DIG. 30 |
| 5,848,882 A | * | 12/1998 | Hashimoto | ......... F04B 39/1073 137/856 |
| 2008/0282685 A1 | * | 11/2008 | Wu | ........................... F01N 1/14 60/299 |

FOREIGN PATENT DOCUMENTS

| | | |
|---|---|---|
| JP | H09-137778 | 5/1997 |
| JP | 2005-083254 | 3/2005 |
| JP | 2007-333106 | 12/2007 |
| JP | 2011-231733 | 11/2011 |

OTHER PUBLICATIONS

Japanese Office Action dated May 31, 2016 in Japanese Patent Application No. 2015-067707 (5 pages, with English translation).

* cited by examiner

*Primary Examiner* — Patrick Maines
*Assistant Examiner* — Dapinder Singh
(74) *Attorney, Agent, or Firm* — Smith, Gambrell & Russell, LLP

(57) ABSTRACT

An external air introduction apparatus includes: an external air introduction opening that guides external air into an exhaust channel, and opened and closed by a pressure difference between an external air pressure and a pressure inside the exhaust channel; a valve plate having a valve body that elastically deforms due to the pressure difference; a base plate stacked on the valve plate and having an opening that faces the valve body and smaller than the valve body and a seat surface formed around the opening; and a restriction plate that restricts elastic deformation of the valve body. The opening is closed and opened by the contact and separation of the valve body and the seat surface. The plates are fixed to a wall that forms the exhaust channel with a fastening member.

20 Claims, 3 Drawing Sheets

EXTERNAL AIR INTRODUCTION APPARATUS

CROSS REFERENCES TO RELATED APPLICATIONS

The present application claims priority from Japanese Patent Application No. 2015-067707 filed on Mar. 21, 2015, the entire contents of which are hereby incorporated by reference.

BACKGROUND

1. Technical Field

The present invention relates to an external air introduction apparatus that opens and closes an external air introduction opening that guides external air into exhaust gas.

2. Related Art

In recent years, exhaust gas regulations have been tightened not only regarding the automotive engines but also regarding general-purpose engines used in construction machines, agricultural machines, etc. Therefore, configurations in which a catalyst is provided in an exhaust muffler to burn unburned fuel gas remaining in exhaust gas, as in a general-purpose engine described in Japanese Unexamined Patent Application Publication No. 2005-83254, have been proposed. Such an exhaust muffler adopts a configuration that includes an external air introduction opening that introduces external air so that external air mixes with exhaust gas to increase the oxygen concentration and promote combustion of unearned fuel gas.

SUMMARY OF THE INVENTION

However, in a configuration adopted by such an exhaust muffler among others in which an external air introduction opening open to an exhaust channel through which exhaust gas is guided is provided with a check valve, the check valve permits air to flow from the external air introduction opening into the exhaust channel and checks flow of exhaust gas from the external air introduction opening to the outside of the exhaust channel. In some cases, this check valve includes three or more members, for instance, a base plate provided with a seat surface, a valve plate provided with a valve body, and a restriction plate that restricts deformation of the valve body. In such cases, a structure for attachment of the check valve to a wall that forms the exhaust channel tends to be complicated and, moreover, positional deviations between the three or more members sometimes occur.

It is desirable to provide an external air introduction apparatus capable of being easily and accurately attached to a wall of an exhaust channel.

An aspect of the present invention provides an external air introduction apparatus includes an external air introduction opening that guides external air into an exhaust channel through which exhaust gas is guided and that is opened and closed by a pressure difference between an external air pressure and a pressure inside the exhaust channel, a valve plate having a valve body that elastically deforms from an open position to a closed position in accordance with the pressure difference, and a base plate stacked on the valve plate and having an opening that is formed at a position facing the valve body and that is smaller in area than the valve body and a seat surface that is formed around the opening. The opening is closed by a contact of the valve body with the seat surface when the valve body is at the closed position. The opening is opened by a separation of the valve body from the seat surface when the valve body is at the open position. The apparatus further includes a restriction plate that is stacked on an opposite side of the valve plate to the base plate and that restricts elastic deformation of the valve body into a range up to the open position. The valve plate, the base plate, and the restriction plate are fixed to a wall that forms the exhaust channel, with at least one fastening member that penetrates the valve plate, the base plate, and the restriction plate.

The valve plate may have two through holes at two sides across the valve body, and each of the base plate and the restriction plate may have counter holes at positions that face the two through holes of the valve plate. The at least one fastening member may include two fastening members that correspond respectively to the two through holes, and the two fastening members may be inserted through the through holes and the counter holes.

The external air introduction apparatus may further include a filter that is disposed in contact with an opposite side of the base plate to the valve plate and that traps a foreign object that moves together with the external air toward the opening of the base plate, and a cover member that is disposed in contact with an opposite side of the filter to the base plate and that, together with the base plate, clamps the filter. The at least one fastening member may penetrate the filter and the cover member as well as the valve plate, the base plate, and the restriction plate and may fix the valve plate, the base plate, the restriction plate, the filter, and the cover member to the wall.

The external air introduction apparatus may be provided on a portion of the wall, the portion being outside the exhaust channel.

DETAILED DESCRIPTION

Figure 1:
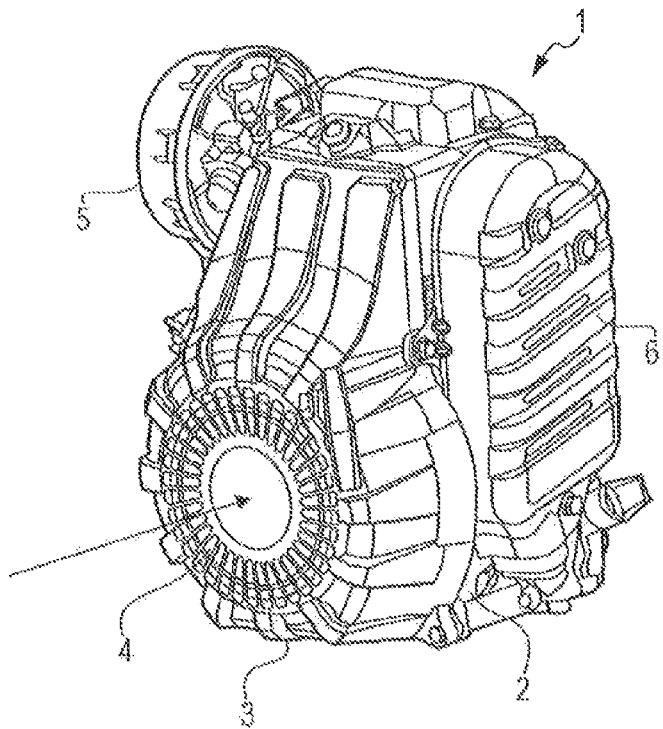
FIG. 1 is an external perspective view of an engine.

Hereinafter, preferred implementations of the present invention will be described with reference to the accompanying drawings. The dimensions, materials, other concrete numerical values, and the like indicated in conjunction with the preferred implementations are mere examples for facilitating the understanding of the invention and do not limit the invention unless otherwise specifically mentioned. Incidentally, in this specification and the drawings, elements that nave substantially the same functions and configurations are denoted by the same reference characters and redundant descriptions of those elements are omitted. Furthermore, elements that are not directly relevant to the invention are omitted from illustration in the drawings.

FIG. 1 is an external perspective view of an engine 1. The engine 1 is a general-purpose engine mounted in, for instance, a rammer that is a construction machine. A cooling fan 4, covered by a fan cover 3, is attached to an engine body 2. Inside the engine body 2, a crankshaft (not graphically illustrated) is disposed with its rotation axis lying in a direction of an arrow in FIG. 1. The cooling fan 4 is fixed to an end of the crankshaft. As the crankshaft rotates, the cooling fan 4 rotates to cool the engine 1.

The other end of the crankshaft is protruded from a back side of the engine body 2 in FIG. 1 (the opposite side of the engine body 2 to the cooling fan 4). Although neither described in detail nor graphically illustrated, the other end of the crankshaft is protruded into a rammer crankcase provided at a rammer body side, and is connected, via a clutch, to an eccentric crankshaft that is housed in the rammer crankcase. As the crankshaft rotates, power is transmitted via the eccentric crankshaft and the like to a compaction plate and moves the compaction plate back and forth, whereby the ground or the like can be struck to be compact and hard.

Furthermore, an air cleaner 5 that removes dust or the like from intake air is attached to the engine body 2. A muffler cover 6 is attached to the opposite side of the engine body 2 to the air cleaner 5, that is, a side across the engine body 2 from the air cleaner 5.

Figure 2:
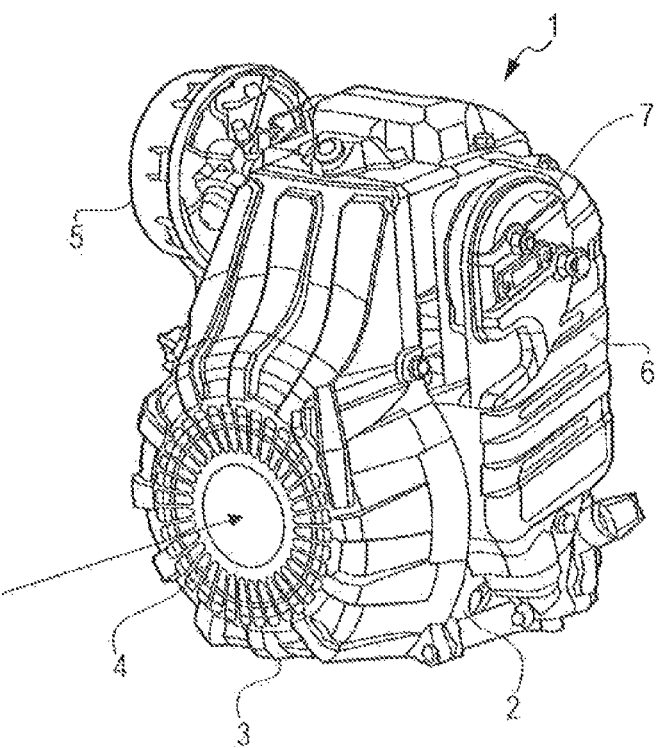
FIG. 2 is a perspective view in which the muffler cover illustrated in FIG. 1 is partially cut away.

FIG. 2 is a perspective view in which the muffler cover 6 illustrated in FIG. 1 is partially cut away. As illustrated in FIG. 2, an exhaust muffler 7 is attached to a portion of the engine body 2, the portion being covered by the muffler cover 6. When intake air is guided through the air cleaner 5 into a combustion chamber (not illustrated) in the engine body 2 and fuel burns in the combustion chamber, exhaust gas produced by the combustion is discharged from the combustion chamber into the exhaust muffler 7.

The exhaust muffler 7 lowers the pressure and the temperature of exhaust gas and reduces exhaust sound. Furthermore, the exhaust muffler 7 in this implementation functions to control the exhaust gas using a catalyst. Hereinafter, a configuration of the exhaust muffler 7 will be described in detail.

Figure 3:
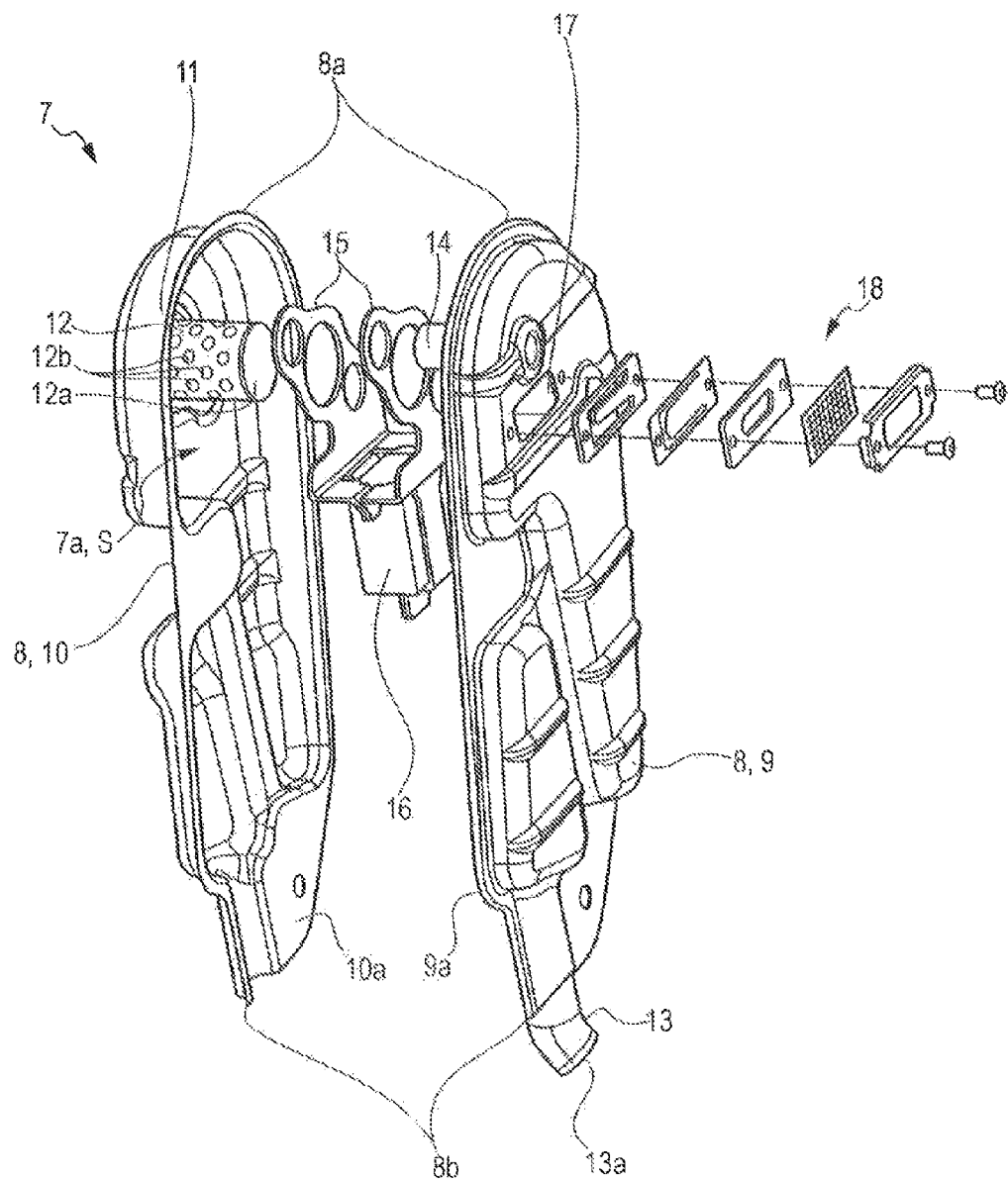
FIG. 3 is an exploded perspective view of an exhaust muffler.

FIG. 3 is an exploded perspective view of the exhaust muffler 7. As illustrated in FIG. 3, the exhaust muffler 7 has a muffler body 8 (wall) that forms therein an exhaust channel 7*a*. In one implementation, the muffler body 8 may serve as a "wall". The muffler body 8 includes an obverse-side member 9 and a reverse-side member 10. The obverse-side member 9 is disposed at the opposite side to the engine body 2, and the reverse-side member 10 is disposed at the side facing the engine body 2. The obverse-side member 9 and the reverse-side member 10 are assembled into the muffler body 8, by placing facing surfaces 9*a* and 10*a* of the two members that face each other in contact with each other.

When the obverse-side member 9 and the reverse-side member 10 are assembled (hereinafter, simply referred to as the assembled state), the obverse-side member 9 and the reverse-side member 10 face each other and their facing surfaces 9*a* and 10*a* are in contact with each other, with a space S being kept between the obverse-side member 9 and the reverse-side member 10.

An exhaust introduction opening 11 is formed in the reverse-side member 10, more specifically, in a portion thereof which is adjacent to one end 8*a* of the muffler body 8. In the assembled state, the exhaust introduction opening 11 provides communication between the inside and outside of the muffler body 8. An exhaust pipe 12 that communicates with the combustion chamber in the engine body 2 is connected to the exhaust introduction opening 11. A distal end of the exhaust pipe 12 is protruded into the space S. In this implementation, the exhaust pipe 12 is formed integrally with the reverse-side member 10.

The exhaust pipe 12 has a closed distal end 12*a*. A portion of the exhaust pipe 12 which is located within the space S in the assembled state has a plurality of communication holes 12*b* that provide communication between the inside and outside of the exhaust pipe 12. Exhaust gas discharged from the combustion chamber is guided into the space S of the muffler body 8 via the communication holes 12*b* of the exhaust pipe 12. That is, the exhaust introduction opening 11 performs a function of guiding exhaust gas from the engine body 2 into the space S within the muffler body 8.

A lead-out pipe 13 is a pipe member disposed at another end 8*b* that is an end opposite to the one end 8*a* where the exhaust introduction opening 11 is formed. In the assembled state, an exhaust opening 13*a* that is an opening of the lead-out pipe 13 is protruded to the outside of the exhaust channel 7*a* of the muffler body 8 (hereinafter, simply referred to as the outside of the muffler body 8), and an opening of the lead-out pipe 13 which is at a side opposite to the exhaust opening 13*a* is protruded into the space S within the muffler body 8, so that the lead-out pipe 13 provides communication between the space S and the outside of the muffler body 8.

The exhaust gas guided from the exhaust introduction opening 11 into the space S flows through the space S and is discharged from the exhaust opening 13*a*. Thus, in the muffler body 8, exhaust gas discharged from the engine body 2 flows through the channel that is formed by the space S.

A guide member 14 is a hollow cylindrical member that, in the assembled state of the muffler body 8, extends from the reverse-side member 10 to the obverse-side member 9. In the muffler body 8, two guide members 14 are disposed. A catalyst holder 15 holds a catalyst 16 and is supported by the guide members 14 and housed in the space S of the muffler body 8. That is, the catalyst 16 is housed within the muffler body 8.

An external air introduction opening 17 is formed in the obverse-side member 9, more specifically, at a position therein that faces the exhaust introduction opening 11. In other words, the external air introduction opening 17 is located at an upstream side of the exhaust opening 13*a* and the catalyst 16 in the flowing direction of exhaust gas. An external air introduction apparatus 18 is provided on the outside of the muffler body 8. The external air introduction apparatus 18 opens and closes the external air introduction opening 17 according to pressure difference between the external air pressure and the pressure inside the muffler body 8 (exhaust channel 7*a*). When the external air introduction apparatus 18 opens the external air introduction opening 17, external air flows from the external air introduction opening 17 into the muffler body 8 (exhaust channel 7*a*).

Specifically, when the pressure in the space S within the muffler body 8 is smaller than the external air pressure by at least a predetermined amount, the external air introduction apparatus 18 turns into an open valve state. During the open valve state of the external air introduction apparatus 18, external air is led from the external air introduction opening 17 into the space S. Then, the catalyst 16 disposed in the space S within the muffler body 8 promotes reactions between the external air (air) and exhaust gas introduced into the space S. As a result, hydrocarbons, carbon monoxide, nitrogen oxides, etc. that are contained in exhaust gas are reduced (controlled).

Figure 4:
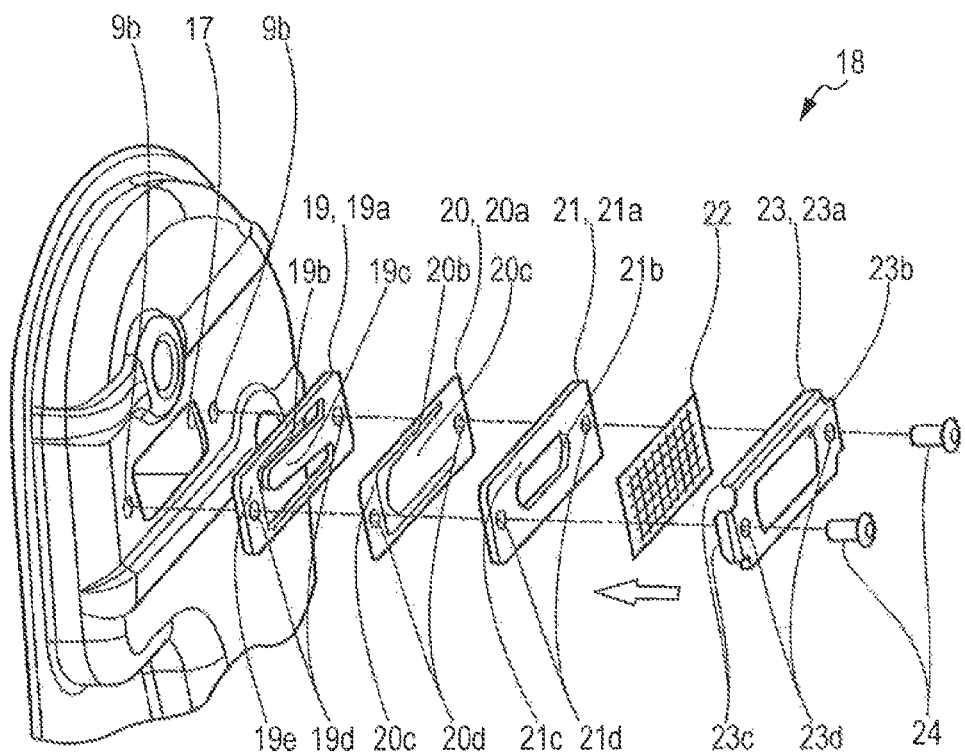
FIG. 4 is a view extracted from FIG. 3, illustrating an external air introduction apparatus and its vicinities.

FIG. 4 is a view extracted from FIG. 3, illustrating the external air introduction apparatus 18 and its vicinities. As illustrated in FIG. 4, the obverse-side member 9 has fastening holes 9*b* at two sides across the external air introduction opening 17. The fastening holes 9*b* extend through the obverse-side member 9 from the outside to the inside of the muffler body 8.

The external air introduction apparatus 18 includes a restriction plate 19, a valve plate 20, a base plate 21, a filter 22, and a cover member 23. These members are stacked in that order on the obverse-side member 9, more specifically, at a site thereon where the external air introduction opening 17 and the fastening holes 9b are formed. In FIG. 4, the stacking direction is indicated by a blank arrow.

The restriction plate 19 has a substantially flat platy main body 19a. The main body 19a has a restriction hole 19b that extends through the main body 19a in the stacking direction. A protrusion 19c is protruded from the main body 19a into the restriction hole 13b. Furthermore, the main body 19a has, at two sides across the restriction hole 19b, counter holes 19d that extend through the main body 19a in the stacking direction and that face the fastening holes 9b of the obverse-side member 9. The restriction plate 19 is stacked on the opposite side of the valve plate 20 to the base plate 21.

The valve plate 20 has a substantially flat platy main, body 20a. The main body 20a has a valve hole 20b chat extends through the main body 20a in the stacking direction. A valve body 20c is protruded from the main body 20a into the valve hole 20b. The valve body 20c elastically deforms in the stacking direction according to pressure difference between the external air pressure and the pressure inside the muffler body 8 (inside the exhaust channel 7a).

The protrusion 19c of the restriction plate 13 has been slightly deformed to an external air introduction opening 17 side relatively to the main body 19a of the restriction plate 19, more specifically, relatively to a contact surface 19e thereof that contacts the main body 20a of the valve plate 20. When the external air pressure pressurizes the valve body 20c to the external air introduction opening 17 side, the valve body 20c elastically deforms to an open position at which the valve body 20c comes into contact with the protrusion 19c. In this manner, the restriction plate 19 restricts the elastic deformation of the valve body 20c into a range up to the opening position.

Furthermore, the main body 20a of the valve plate 20 has through holes 20d that extend through the main body 20a in the stacking direction, at two sides across the valve hole 20b and the valve body 20c.

The base plate 21 has a substantially flat platy main body 21a, and is stacked on the valve plate 20. Furthermore, the main body 21a has an opening 21b that extends through the main body 21a in the stacking direction. The opening 21b is formed at a position that faces the valve body 20c when the base plate 21 is stacked on the valve plate 20.

Of the main body 21a of the base plate 21, a portion that surrounds the opening 21b forms a seat surface 21c. The opening 21b is smaller in area than the valve body 20c. When the valve body 20c is at a closed position, the valve body 20c is in contact with the seat surface 21c, closing the opening 21b. When the valve body 20c is at the open position, the valve body 20c is apart from the seat surface 21c, opening the opening 21b.

Furthermore, the main body 21a of the base plate 21 has, at two sides across the opening 21b, counter holes 21d that extend through the main body 21a in the stacking direction and that face the through holes 20d of the valve plate 20.

The filter 22 is made up of, for example, a mesh member, and is disposed in contact with the opposite side of the base plate 21 to the valve plate 20. The filter 22 allows external air to pass through and traps foreign objects that move together with external air toward the opening 21b of the base plate 21 and that are larger than the pores of the mesh member.

The filter 22 is larger in area than the opening 21b of the base plate 21, and covers the opening 21b. However, the filter 22 has an external shape whose width in a direction in which the two counter holes 21d are aligned is smaller than an interval between the two counter holes 21d. Therefore, when the filter 22 is stacked on the base plate 21, the filter 22 does not face or overlap the two counter holes 21d.

The cover member 23 has a substantially flat platy main body 23a. The cover member 23 is disposed in contact with the opposite side of the filter 22 to the base plate 21. The cover member 23 and the base plate 21 clamp the filter 22.

The main body 23a of the cover member 23 has a cover hole 23b that extends through the main body 23a in she stacking direction. The cover hole 23b is smaller in area than the filter 22 so that the cover hole 23b is covered by the filter 22.

Furthermore, an external edge of the main body 23a of the cover member 23 has bent portions 23c that are bent to a base plate 21 side. The bent portions 23c substantially prevent the filter 22 from falling from a gap between the base plate 21 and the cover member 23.

The main body 23a of the cover member 23 has, at two sides across the cover hole 23b, counter holes 23d that extend through the main body 23a in the stacking direction and that face the counter holes 21d of the base plate 21.

When the restriction plate 19, the valve plate 20, the base plate 21, the filter 22, and the cover member 23 are stacked, the counter holes 19d, the through holes 20d, the counter holes 21d, and the counter holes 23d can be aligned in position with the fastening holes 9b of the obverse-side member 9.

Two rivets 24 (fastening members), corresponding to the two fastening holes 9b, are inserted from the counter holes 23d, through the counter holes 21d, the through holes 20d, and the counter holes 19d in that order, and then through the fastening holes 9b. In one implementation, the rivets may serve as "fastening members" or fasteners. After that, distal ends of the rivets 24 that protrude from the fastening holes 9b into the muffler body 8 are crimped to fix the restriction plate 19, the valve plate 20, the base plate 21, the filter 22, and the cover member 23 to the muffler body 8.

Thus, the rivets 24 that penetrate the restriction plate 19, the valve plate 20, and the base plate 21 fix the restriction plate 19, the valve plate 20, and the base plate 21 to the muffler body 8. Therefore, these members can be easily attached by using only the two rivets 24, and positional deviation between the members does not easily occur, and the positional accuracy in attachment can be improved. Furthermore, the number of component parts can be reduced in comparison with a case where a fastening member is used in addition to the rivets 24.

Furthermore, since the external air introduction apparatus 18 can be firmly attached to the muffler body 8 of the exhaust muffler 7, the external air introduction apparatus 18 is suitable for, for instance, exhaust mufflers of engines that undergo vibrations or the like, and is effective not merely for exhaust mufflers of engines in general but particularly for general-purpose engines for construction machines.

Incidentally, in the foregoing implementation, besides the restriction plate 19, the valve plate 20, and the base place 21, the filter 22 and the cover member 23 are also fixed to the muffler body 8 by the same rivets 24. However, the filter 22 and the cover member 23 may be fixed to the muffler body 8 by using a separate fastening member. However, fixing the filter 22 and the cover member 23 together with the restriction plate 19, the valve plate 20, and the base plate 21 by the rivets 24 makes it possible to further improve operation efficiency, prevent positional deviation of the filter 22 and the cover member 23, and reduce the number of component parts.

Furthermore, although in the foregoing preferred implementation, the valve plate 20 has the through holes 20*d* at the two sides across the valve body 20*c*, the through holes 20*d* may be disposed at any positions and the number of through holes 20*d* may be one. However, provision of two through holes 20*d* at opposite sides of the valve body 20*c* makes it possible to prevent an event that a gap is formed between the valve plate 20 and the base plate 21 and therefore degrades the opening-closing accuracy of the valve body 20*c*.

Furthermore, although in the foregoing implementation, the external air introduction apparatus 18 is provided on the outside of the muffler body 8, the external air introduction apparatus 18 may be provided inside the muffler body 8. However, provision of the external air introduction apparatus 18 outside the muffler body 8 makes it possible to avoid an event that the external air introduction apparatus 18 inhibits flow of gas inside the muffler body 8.

While the preferred implementations of the invention have been described with reference to the accompanying drawings, it is to be understood that the invention is not limited to the foregoing implementations or the like and that various modifications and changes within the scope described by the appended claims are encompassed within the technical range of the invention.

The invention is applicable to an external air introduction apparatus that opens and closes an external air introduction opening that guides external air into exhaust gas.

The invention claimed is:

1. An external air introduction apparatus comprising:
   a valve plate configured to open and close an external air introduction opening that guides external air into an exhaust channel through which exhaust gas is guided, the valve plate having a valve body that elastically deforms from an open position to a closed position in accordance with a pressure difference between a pressure of the external air and a pressure inside the exhaust channel;
   a base plate stacked on the valve plate and having an opening that is formed at a position facing the valve body and that is smaller in area than the valve body and a seat surface that is formed around the opening, the opening being configured to be closed by a contact of the valve body with the seat surface when the valve body is at the closed position, and being configured to be opened by a separation of the valve body from the seat surface when the valve body is at the open position; and
   a restriction plate that is stacked on an opposite side of the valve plate to the base plate and that restricts elastic deformation of the valve body into a range up to the open position,
   a fastener configured to fix the valve plate and the base plate and the restriction plate to a wall that forms the external air introduction opening, the fastener being configured to penetrate the valve plate and the base plate and the restriction plate, and for being inserted into a fastening hole provided in the wall.

2. The external air introduction apparatus according to claim 1, wherein:
   the valve plate has two through holes at two sides across the valve body;
   each of the base plate and the restriction plate has counter holes at positions that face the two through holes of the valve plate;
   the fastener comprises two fastener elements that correspond respectively to the two through holes; and
   the two fastener elements are inserted through the through holes and the counter holes.

3. The external air introduction apparatus according to claim 1, further comprising:
   a filter that is disposed in contact with an opposite side of the base plate to the valve plate and that traps a foreign object that moves together with the external air toward the opening of the base plate; and
   a cover member that is disposed in contact with an opposite side of the filter to the base plate and that, together with the base plate, clamps the filter,
   wherein the fastener is configured to penetrate the cover member as well as the valve plate and the base plate and the restriction plate, and to fix the valve plate and the base plate and the restriction plate and the filter and the cover member to the wall.

4. The external air introduction apparatus according to claim 2, further comprising:
   a filter that is disposed in contact with an opposite side of the base plate to the valve plate and that traps a foreign object that moves together with the external air toward the opening of the base plate; and
   a cover member that is disposed in contact with an opposite side of the filter to the base plate and that, together with the base plate, clamps the filter,
   wherein the fastener is configured to penetrate the cover member as well as the valve plate and the base plate and the restriction plate, and to fix the valve plate and the base plate and the restriction plate and the filter and the cover member to the wall.

5. The external air introduction apparatus according to claim 1, the external air introduction apparatus being provided on a portion of the wall, the portion being outside the exhaust channel.

6. The external air introduction apparatus according to claim 2, the external air introduction apparatus being provided on a portion of the wall, the portion being outside the exhaust channel.

7. The external air introduction apparatus according to claim 3, the external air introduction apparatus being provided on a portion of the wall, the portion being outside the exhaust channel.

8. The external air introduction apparatus according to claim 1, wherein the exhaust channel has an upstream exhaust introduction opening and a downstream outlet, and the air introduction opening directs introduced air, upon initial introduction, into contact with exhaust gas travelling in the exhaust channel.

9. The external air introduction apparatus according to claim 8, wherein the air introduction opening is positioned so as to initially introduce the introduction air at a location downstream of the upstream exhaust introduction opening.

10. The external air introduction apparatus according to claim 1 wherein the fastener comprises at least one rivet.

11. The external air introduction apparatus according to claim 2 wherein the two fastener elements are each rivets.

12. The external air introduction apparatus according to claim 1, wherein the restriction plate is configured as to be in a flush relationship with a bordering exterior surface of the wall, the bordering exterior surface of the wall being opposed to a bordering interior surface of the wall and having an edge defining the external air introduction opening, and said restriction plate being positioned such that exhaust gas travelling along the bordering interior surface of the wall comes into contact with air passing through both the restriction plate and the air introduction opening.

13. An exhaust muffler comprising:
a muffler body comprising an exhaust channel through which exhaust gas is guided, a first wall having an external air introduction opening that guides external air into the exhaust channel and a fastening hole, and a second wall having an exhaust introduction opening configured to guide exhaust gas into the exhaust channel, the first wall being disposed opposite to the second wall; and
an external air introduction apparatus fixed to the first wall and configured to cover the external air introduction opening,
the external air introduction apparatus comprising:
a valve plate having a valve body that elastically deforms from an open position to a closed position in accordance with a pressure difference between a pressure of the external air and a pressure inside the exhaust channel;
a base plate stacked on the valve plate and having an opening that is formed at a position facing the valve body and that is smaller in area than the valve body and a seat surface that is formed around the opening, the opening being configured to be closed by a contact of the valve body with the seat surface when the valve body is at the closed position, and being configured to be opened by a separation of the valve body from the seat surface when the valve body is at the open position; and
a restriction plate that is stacked on an opposite side of the valve plate to the base plate and that restricts elastic deformation of the valve body into a range up to the open position,
a fastener fixing the valve plate and the base plate and the restriction plate to the first wall, the fastener penetrating the valve plate, the base plate, and the restriction plate and being inserted into the fastening hole.

14. The exhaust muffler according to claim 13, wherein:
the valve plate has two through holes at two sides across the valve body;
each of the base plate and the restriction plate has counter holes at positions that face the two through holes of the valve plate;
the fastener comprises two fastener elements that correspond respectively to the two through holes; and
the two fastener elements are inserted through the through holes and the counter holes.

15. The exhaust muffler according to claim 13, further comprising:
a filter that is disposed in contact with an opposite side of the base plate to the valve plate and that traps a foreign object that moves together with the external air toward the opening of the base plate; and
a cover member that is disposed in contact with an opposite side of the filter to the base plate and that, together with the base plate, clamps the filter,
wherein the fastener penetrates the cover member as well as the valve plate, the base plate, and the restriction plate and fixes the valve plate, the base plate, the restriction plate, the filter, and the cover member to the first wall.

16. The exhaust muffler according to claim 13,
wherein the exhaust channel has an upstream exhaust introduction opening and a downstream outlet, and the air introduction opening directs introduced air, upon initial introduction, into contact with exhaust gas travelling in the exhaust channel.

17. An engine comprising:
an engine body,
a muffler body comprising an exhaust channel through which exhaust gas from the engine body is guided, a first wall having an external air introduction opening that guides external air into the exhaust channel and a fastening hole, and a second wall having an exhaust introduction opening configured to guide exhaust gas from the engine body into the exhaust channel, the first wall being disposed opposite to the second wall; and
an external air introduction apparatus fixed to the first wall and configured to cover the external air introduction opening,
the external air introduction apparatus comprising:
a valve plate having a valve body that elastically deforms from an open position to a closed position in accordance with a pressure difference between a pressure of the external air and a pressure inside the exhaust channel;
a base plate stacked on the valve plate and having an opening that is formed at a position facing the valve body and that is smaller in area than the valve body and a seat surface that is formed around the opening, the opening being configured to be closed by a contact of the valve body with the seat surface when the valve body is at the closed position, and being configured to be opened by a separation of the valve body from the seat surface when the valve body is at the open position;
a restriction plate that is stacked on an opposite side of the valve plate to the base plate and that restricts elastic deformation of the valve body into a range up to the open position; and
a fastener penetrating the valve plate, the base plate, and the restriction plate and being inserted into the fastening hole, and fixing the valve plate, the base plate, and the restriction plate to the first wall.

18. The engine according to claim 17, wherein:
the valve plate has two through holes at two sides across the valve body;
each of the base plate and the restriction plate has counter holes at positions that face the two through holes of the valve plate;
the fastener comprises two fastener elements that correspond respectively to the two through holes; and
the two fastener elements are inserted through the through holes and the counter holes.

19. The engine according to claim 17, further comprising:
a filter that is disposed in contact with an opposite side of the base plate to the valve plate and that traps a foreign object that moves together with the external air toward the opening of the base plate; and
a cover member that is disposed in contact with an opposite side of the filter to the base plate and that, together with the base plate, clamps the filter,
wherein the fastener penetrates the cover member as well as the valve plate, the base plate, and the restriction plate and fixes the valve plate, the base plate, the restriction plate, the filter, and the cover member to the first wall.

20. The engine according to claim 17, wherein the exhaust channel has an upstream exhaust introduction opening and a downstream outlet, and the air introduction opening directs introduced air, upon initial introduction, into contact with exhaust gas travelling in the exhaust channel.

* * * * *